March 19, 1929.  J. J. McBRIDE  1,706,123
TANK CAR DISCHARGE VALVE MECHANISM
Filed June 29, 1921   3 Sheets-Sheet 1
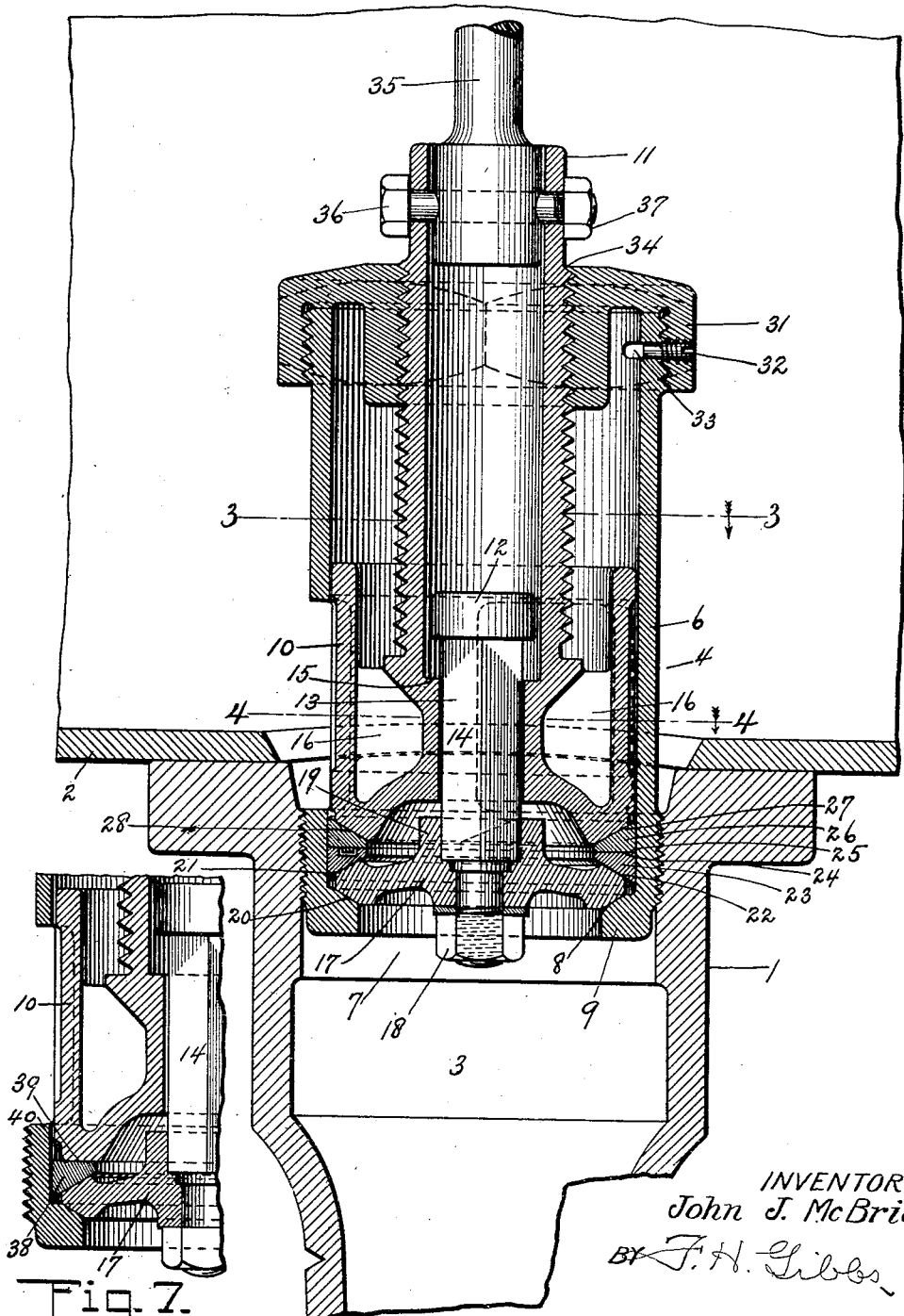
INVENTOR:
John J. McBride
BY F. H. Gibbs
ATTORNEY.

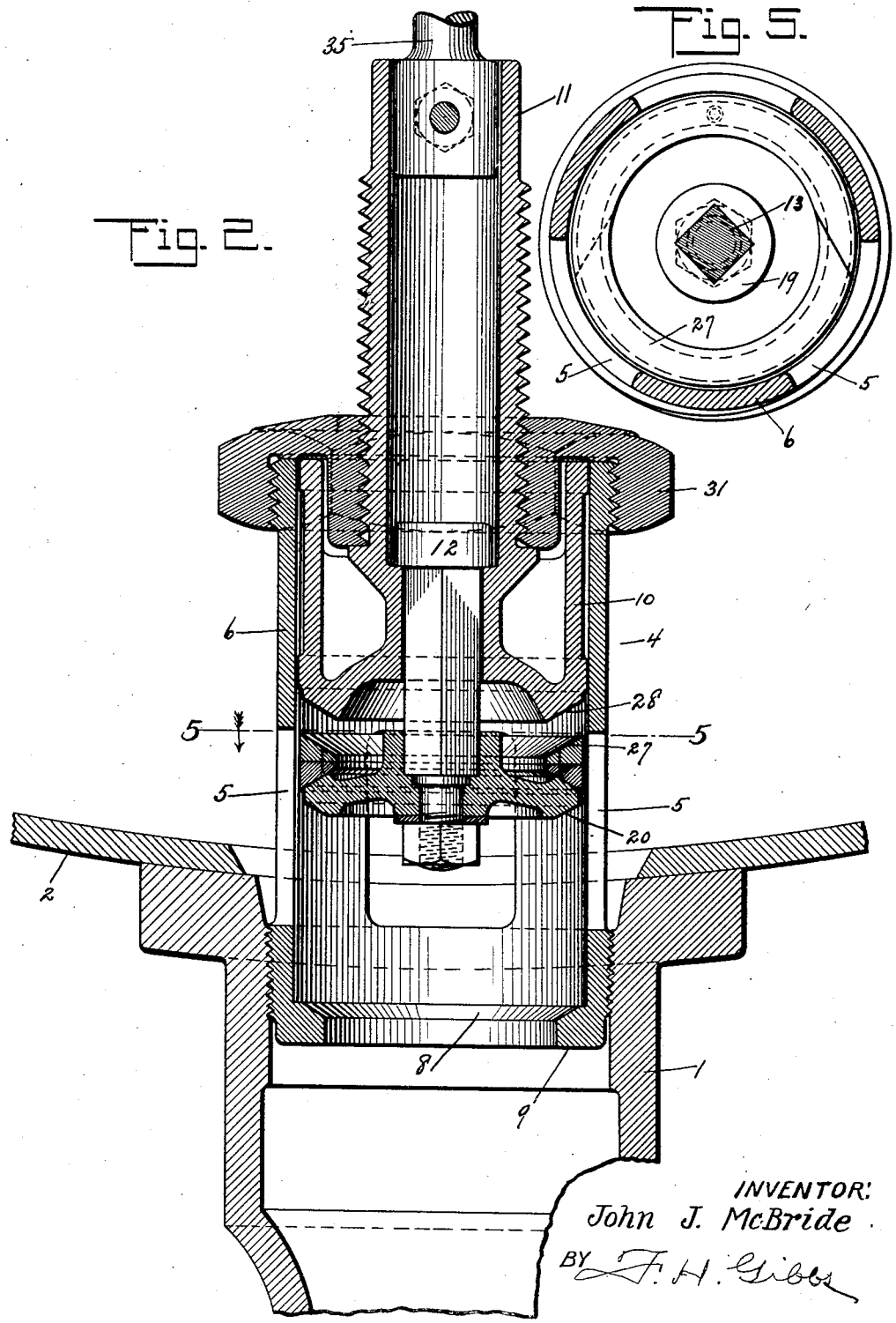

March 19, 1929.　　　J. J. McBRIDE　　　1,706,123
TANK CAR DISCHARGE VALVE MECHANISM
Filed June 29, 1921　　3 Sheets-Sheet 3
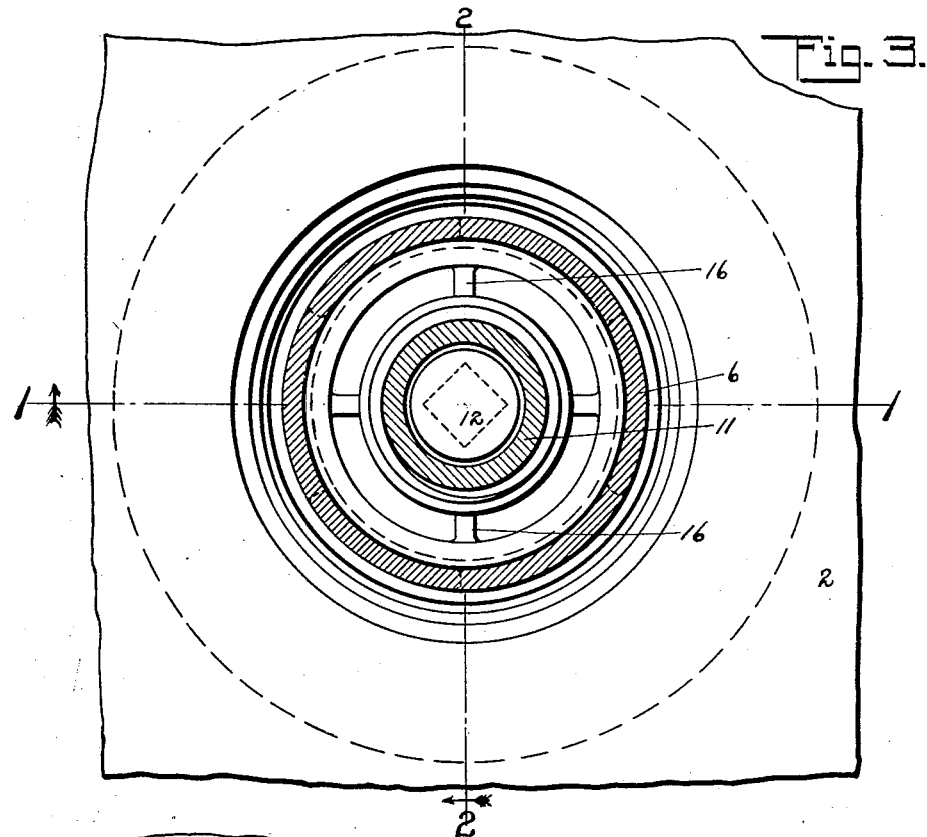
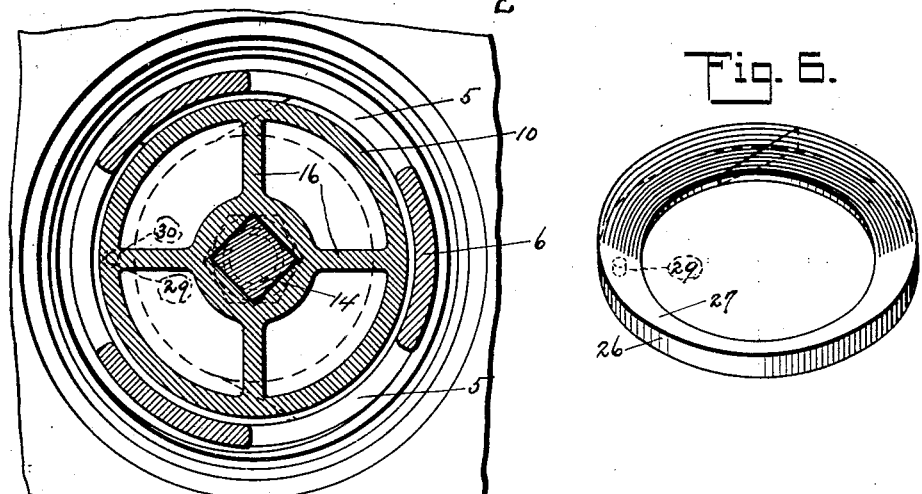
INVENTOR:
John J. McBride
BY F. H. Gibbs
ATTORNEY.

Patented Mar. 19, 1929.

1,706,123

UNITED STATES PATENT OFFICE.

JOHN J. McBRIDE, OF BAYONNE, NEW JERSEY, ASSIGNOR TO AMERICAN CAR AND FOUNDRY COMPANY, OF NEW YORK, N. Y., A CORPORATION OF NEW JERSEY.

TANK-CAR DISCHARGE-VALVE MECHANISM.

Application filed June 29, 1921. Serial No. 481,375.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a central vertical section taken on the line 1—1 of Fig. 3 of my improved tank car discharge valve mechanism, the valve being shown in closed position;

Fig. 2 is a similar view taken on the line 2—2 of Fig. 3, the valve being shown in open position;

Fig. 3 is a horizontal section taken on line 3—3 of Fig. 1;

Fig. 4 is a horizontal section taken on line 4—4 of Fig. 1;

Fig. 5 is a horizontal section taken on line 5—5 of Fig. 2;

Fig. 6 is a view of one of the bronze spring seating rings; and

Fig. 7 is a fragmentary view showing a modification in which a single spring ring is used.

It is an object of my invention to provide an improved tank car discharge valve of the self grinding type, and it is also an object of my invention to provide a discharge valve mechanism comprising a plurality of valve portions adapted to operate as valves and a movable seat for one of the valve portions.

In the drawings, 1 designates a discharge outlet casting riveted or otherwise secured to the tank sheet 2 and having a discharge opening 3. In the upper end of the discharge opening 3 and having a screw threaded engagement with the outlet casting 1 is a tubular valve cage 4 having inlet openings 5 in the barrel 6 of the cage and an outlet opening 7 surrounded by a valve seat 8 formed in the end 9 of the cage.

Slidably mounted in the cage 4 is a tubular valve portion 10 having a stem 11 adapted to project beyond the cake 4. The stem 11 is tubular and screw threaded for part of its length, the opening in the stem being circular for part of its length so as to receive the cylindrical head 12 on the rectangular stem 13, the body portion 14 of which fits loosely in a rectangular opening in the stem 11, the movement of the stem 13 in one direction being limited by the engagement of the head 12 with the shoulder 15 formed at the junction of the openings in the stem. Reenforcing ribs 16 aid in securing the stem 11 to the body portion of the valve portion 10.

Mounted on the reduced lower end of the stem 13 is a valve portion 17 held in place by nut 18 and having a projecting portion 19 provided with a rectangular opening adapted to receive the body portion 14 of the stem 13. The valve portion 17 is provided with faces 20 and 21, the face 20 being adapted to engage with the seat 8 on the valve cage 4 while the face 21 is engaged by the face 22 on the spring ring 23. The spring ring 23 is substantially triangular in cross section and with its face 22 engaging the face 21 it has a face 24, substantially horizontal when in use, adapted to be engaged by a face 25 of a similar ring 26 which also has a face 27 adapted to be engaged by the face 28 on the tubular valve portion 10.

The rings 23 and 26 are each open at one side as shown in Figs. 4, 5 and 6, the planes of the openings being at an angle to the radii of the rings at the points of opening so that as the rings are expanded by the forcing together of the valve portions 10 and 17, the ends of the rings will not be spread apart at the openings but will be kept together and so prevent leakage. The pairs of rings are assembled with the openings diametrically opposite and the rings are kept with the openings so positioned by means of a pin 29 in one ring engaging in an opening 30 in the other ring.

A cap nut 31, threaded on to the cage 6 and secured in place by a set screw 32 engaging in a slot 33, is provided with an opening 34 in which is threaded the stem 11 of the valve portion 10. An operating shaft 35 is inserted in the end of the stem 11 and secured in place by bolt 36 and nut 37.

In the modified construction shown in Fig. 7, only one spring ring 38 is used and the face 39 on the tubular valve portion 10 is adapted to engage with the substantially horizontal face 40 on the ring 38.

Assuming the valve closed as shown in Fig. 1, rotation of the shaft 35 will cause a rotation of the stem 11 and valve portion 10. Rotation of the stem 11 causes the valve portion 10 to be raised from its seat on the ring 26 permitting the rings 26 and 23 to spring away from their engagement with the inner wall of the valve cage 4, and rotates the valve portion 17 upon the seat 8. The valve portion 17 will be rotated upon the seat 8 until the shoulder 15 engages the head 12 whereupon the valve portion 17 will be moved from the seat 8. To close the valve, the shaft 35 is rotated in the opposite direction, rotating the valve portions 10 and 17 and lowering them in the cage 4 until the valve portion 17 engages the seat 8, the valve portion 17 then being rotated upon the seat 8 and effecting a cleaning and grinding of the seat 8. The last part of the movement of valve portion 10 serves to exert pressure upon the rings 23 and 26 and gradually force them into engagement with the wall of the cage 4 and, at the same time, exert a gradually increasing pressure upon the valve portion 17 during its movement upon the seat 8. It will be noted that in the closed position of the valve, the valve portion 10 is in engagement with the ring 26 below the bottom level of the openings 5 in the valve cage 4 and aids the valve portion 17 in cutting off the flow through the discharge opening of the outlet casing and in case of damage to the valve portion 17 or the failure of the valve portion 17 to seat properly, the valve portion 10 serves as an emergency valve and controls the flow through the discharge outlet casing by its engagement with the split ring on which it seats and which it will spread into engagement with the cage preventing leakage between the valve portion 10 and valve cage.

What I claim is:

1. In a valve mechanism, a casing, a valve cage having a seat mounted in said casing, a valve portion adapted to be rotated on said seat, a second valve portion adapted to operate said first valve portion and having movement relatively thereto and means adapted to be engaged with said valve cage by the relative movement of said valve portions.

2. In a discharge valve, a casing having a discharge outlet, a valve cage having a valve seat mounted in said outlet, a valve portion adapted to engage said seat to control said outlet, a spring ring carried by said valve portion and a second valve portion carrying said first valve portion and adapted to rotate said first valve portion on said seat and to engage said spring ring to force said first valve portion to said seat.

3. In a discharge valve, a casing having a discharge outlet, a valve cage having a valve seat mounted in said casing, a valve portion engaging said seat to control said outlet, a spring ring carried by said valve portion and a second valve portion connected to effect a predetermined rotation of said first valve portion on said valve seat and to force said spring ring into contact with said first valve portion and said valve cage.

4. The combination with a valve cage having a valve seat, a valve portion mounted in said cage and having a tubular stem threaded in an opening in said cage, said valve portion having a tubular body and webs securing said body and stem, a second valve portion cooperating with said valve seat and having a rectangular stem slidably engaging a correspondingly shaped portion of the stem of said first valve portion, a spring ring loosely mounted between said valve portions and operating means for said valve portions secured in the stem of said first valve portion.

5. The combination with a discharge outlet casing of a valve cage having a valve seat mounted in said casing, a valve portion comprising a tubular body, a tubular stem threaded in an opening in said cage and webs uniting said body and stem, a second valve portion comprising a body cooperating with the valve seat and a headed angular stem slidably engaging a correspondingly shaped portion of said tubular stem whereby said valve portions are connected to rotate simultaneously while relatively movable, and a spring ring loosely mounted between said valve portions and expanded into engagement with said cage by the seating of said valve portions.

6. The combination with a discharge outlet casing of a valve cage having a valve seat mounted in said casing, a valve portion mounted in said valve cage comprising a threaded tubular stem engaging in an opening in said cage and a tubular body surrounding said stem and connected thereto by webs, a second valve portion comprising a body cooperating with the valve seat to control said outlet, and a headed angular stem slidably engaging a correspondingly shaped portion of said tubular stem, and spring means loosely mounted between said valve portions and having surfaces cooperating with surfaces on said valve portions and expanded by the relative movement of said bodies into engagement with said cage.

7. In a valve, a valve portion comprising a tubular body having a seating surface and a tubular stem surrounded by said body and secured thereto by webs, a second valve portion comprising a body having a seating surface and a headed angular stem having slidable engagement with a correspondingly shaped portion of said tubular stem whereby said valve portions are relatively movable longitudinally of the stems and are connected for simultaneous rotation, and spring means loosely mounted between said valve portions and cooperating with the seating surfaces of said valve portions to be expanded upon relative movement of said valve portions.

8. In a valve, a valve portion comprising a tubular stem having an angular chamber therein and a tubular body surrounding said stem and joined thereto by spaced integral webs, a second valve portion comprising a headed angular stem slidably mounted in said chamber and projecting therefrom and a body removably mounted on said angular stem and having a correspondingly shaped recess receiving said angular stem, and spring means loosely mounted between said bodies and cooperating therewith in the operation of said valve.

9. In a discharge valve, a casing having a discharge outlet, a valve cage having a valve seat mounted in said outlet, a valve portion for engaging said seat to control said outlet, a second valve portion having a tubular stem threaded in an opening in said cage, a stem for said first valve portion having a head slidably mounted in the stem of said second valve portion and connecting said valve portions for simultaneous rotation, and a spring ring mounted between said valve portions and cooperating therewith.

10. In a discharge valve, a casing having a discharge outlet, a valve cage having a valve seat mounted in said outlet, a valve portion for engaging said seat to control said outlet, a second valve portion carrying said first valve portion and connected to rotate said first valve portion on said seat, and a spring ring loosely mounted between said valve portions, said second valve portion having a tubular stem threaded in an opening in said cage and said first valve portion having a stem telescoping with the stem of said second valve portion.

In witness whereof I have hereunto set my hand.

JOHN J. McBRIDE.